(12) United States Patent
Mastrocola et al.

(10) Patent No.: US 11,705,835 B2
(45) Date of Patent: Jul. 18, 2023

(54) SENSORLESS POSITION DETERMINATION OF AN ELECTRIC MACHINE

(71) Applicant: Hamilton Sundstrand Corporation, Charlotte, NC (US)

(72) Inventors: Naison E. Mastrocola, West Cornwall, CT (US); Scott R. Durkee, New Haven, VT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/504,729

(22) Filed: Oct. 19, 2021

(65) Prior Publication Data

US 2023/0119985 A1 Apr. 20, 2023

(51) Int. Cl.
*H02P 6/185* (2016.01)
*H02P 6/08* (2016.01)
*H02P 6/17* (2016.01)

(52) U.S. Cl.
CPC ............... *H02P 6/185* (2013.01); *H02P 6/08* (2013.01); *H02P 6/17* (2016.02)

(58) Field of Classification Search
CPC ............... H02P 6/185; H02P 6/08; H02P 6/17
USPC .................. 318/400.33, 400.32, 400.01, 700
See application file for complete search history.

(56) References Cited

U.S. PATENT DOCUMENTS

| 4,772,839 | A |   | 9/1988 | MacMinn et al. |
| 5,585,709 | A | * | 12/1996 | Jansen ................ H02P 6/183 |
|  |  |  |  | 318/807 |
| 6,734,666 | B2 |   | 5/2004 | Voillat |
| 6,801,012 | B1 |   | 10/2004 | Islam et al. |
| 7,271,556 | B2 |   | 9/2007 | Kishibe et al. |
| 9,667,184 | B2 |   | 5/2017 | Lovas et al. |
| 10,594,236 | B2 | * | 3/2020 | Moule ................. H02P 6/185 |

(Continued)

FOREIGN PATENT DOCUMENTS

| EP | 1214777 A1 | 6/2002 |
| EP | 2959573 A2 | 12/2015 |
| EP | 3741667 A1 | 11/2020 |

(Continued)

OTHER PUBLICATIONS

European Search Report for Application No. 22202127.1, dated Mar. 14, 2023, 8 pages.

*Primary Examiner* — David Luo
(74) *Attorney, Agent, or Firm* — Cantor Colburn LLP (57) ABSTRACT

Systems and methods for position determination in an electric machine are provided. Aspects include a DC power source connected to an inverter circuit, an electric motor comprising a rotor and a stator, wherein an output of the inverter circuit is connected to a plurality phase of windings, and a controller configured to operate the electric motor and the inverter circuit, wherein the controller is further configured to determine one or more inactive phase windings from the plurality of phase windings, supply a voltage to the inactive phase windings, receive, from a current sensor connected to the electric motor, a current for each inactive phase winding of the inactive phase windings, determine an inductance for each inactive phase winding of the inactive phase winding based on the current, and determine a position of the rotor in the electric motor based on the inductance for each inactive phase winding.

20 Claims, 7 Drawing Sheets

(56) References Cited

U.S. PATENT DOCUMENTS 10,634,707 B2    4/2020   Mariethoz et al.
10,879,821 B2 *  12/2020  Lakshmi Narasimha ...................
                                                        H02P 21/32

FOREIGN PATENT DOCUMENTS

WO          0110010  A1    2/2001
WO       2014130601  A1    8/2014

\* cited by examiner

SENSORLESS POSITION DETERMINATION OF AN ELECTRIC MACHINE

BACKGROUND

The present invention generally relates to electric machines, and more specifically, to sensorless position determination of an electric machine.

A brushless direct current (BLDC) motor (electric machine) is a type of permanent magnet synchronous motor powered by direct current. The BLDC motor generally includes a moving rotor with permanent magnets and a stationary stator that includes windings of wire into which a voltage is induced as the magnets pass over them. One common configuration of BLDC motor is the three-phase configuration in which the stator has three windings.

The BLDC motor generally operates by electronic commutation in which the BLDC motor is driven according to a commutation sequence. In a three-phase BLDC motor, for example, each step of the commutation sequence includes one winding energized positive (current entering) and another winding energized negative (current exiting), while the third winding is not used (non-energized). Driving two of the three windings generates a magnetic field in the stator windings and the rotor magnets, which produces torque that causes the rotor to rotate. To keep the rotor rotating, the sequence moves to a next step for another winding pair to shift the position of the magnetic field produced by the windings. For a three-phase BLDC motor including phases A, B and C each of which is separated by adjacent phases by 120°, one example commutation sequence may include the following six steps AB-AC-BC-BA-CA-CB.

Many BLDC motors are driven by an inverter (e.g., three-phase inverter) and require the position of the rotor to apply the proper commutation sequence. The rotor position may be obtained in a number of different manners. In one common manner, the BLDC motor includes a position sensor, such as a Hall-effect sensor, that directly senses the position of the rotor. These position sensors require complex electronics for processing the signals for motor commutation. These additional components increase costs, increase weight, and decrease reliability.

BRIEF DESCRIPTION

Embodiments of the present invention are directed to a system. A non-limiting example of the system includes a direct current (DC) power source connected to an inverter circuit, an electric motor comprising a rotor and a stator, wherein an output of the inverter circuit is connected to a plurality phase of windings attached to the stator, and a controller configured to operate the electric motor and the inverter circuit, wherein the controller is further configured to determine one or more inactive phase windings from the plurality of phase windings, supply a voltage to the one or more inactive phase windings, receive, from a current sensor connected to the electric motor, a current for each inactive phase winding of the one or more inactive phase windings, determine an inductance for each inactive phase winding of one or more the inactive phase winding based on the current, and determine a position of the rotor in the electric motor based on the inductance for each inactive phase winding.

In addition to one or more of the features described above, or as an alternative, further embodiments of the system may include that supplying the voltage to the one or more inactive phase windings from the plurality of phase windings occurs while the rotor is rotating at a first speed.

In addition to one or more of the features described above, or as an alternative, further embodiments of the system may include that the plurality of phase windings comprises a first phase winding, a second phase winding, and a third phase winding.

In addition to one or more of the features described above, or as an alternative, further embodiments of the system may include that supplying the voltage to the one or more inactive phase windings from the plurality of phase windings occurs while the rotor is not rotating; and wherein the voltage is supplied to all phase windings in the plurality of phase windings.

In addition to one or more of the features described above, or as an alternative, further embodiments of the system may include that the inactive phase winding comprises a phase winding in the plurality of phase windings not receiving a voltage from the inverter circuit.

In addition to one or more of the features described above, or as an alternative, further embodiments of the system may include that the applying the voltage to the inactive phase winding results in no net toque to the rotor in the electric motor.

In addition to one or more of the features described above, or as an alternative, further embodiments of the system may include that the electric motor comprises a brushless direct current (BLDC) motor.

In addition to one or more of the features described above, or as an alternative, further embodiments of the system may include that the BLDC motor comprises a switched reluctance motor.

In addition to one or more of the features described above, or as an alternative, further embodiments of the system may include that the electric motor drives an actuator.

In addition to one or more of the features described above, or as an alternative, further embodiments of the system may include that the controller is further configured to calculate a position of the actuator based on the position of the rotor.

Embodiments of the present invention are directed to a method. A non-limiting example of the method includes determining, by a controller, one or more inactive phase windings from a plurality of phase windings connected to a stator for an electric motor, wherein the electric motor comprises a rotor, and wherein the electric motor is connected to an inverter circuit, supplying, by the controller operating a voltage source, a voltage to the one or more inactive phase windings, receiving, from a current sensor connected to the electric motor, a current for each inactive phase winding of the one or more inactive phase windings, determining an inductance for each inactive phase winding of one or more the inactive phase winding based on the current, and determining a position of the rotor in the electric motor based on the inductance for each inactive phase winding.

In addition to one or more of the features described above, or as an alternative, further embodiments of the method may include that supplying the voltage to the one or more inactive phase windings from the plurality of phase windings occurs while the rotor is rotating at a first speed.

In addition to one or more of the features described above, or as an alternative, further embodiments of the method may include that the plurality of phase windings comprises a first phase winding, a second phase winding, and a third phase winding.

In addition to one or more of the features described above, or as an alternative, further embodiments of the method may include that supplying the voltage to the one or more inactive phase windings from the plurality of phase windings occurs while the rotor is not rotating; and wherein the voltage is supplied to all phase windings in the plurality of phase windings.

In addition to one or more of the features described above, or as an alternative, further embodiments of the method may include that the inactive phase winding comprises a phase winding in the plurality of phase windings not receiving a voltage from the inverter circuit.

In addition to one or more of the features described above, or as an alternative, further embodiments of the method may include that the applying the voltage to the inactive phase winding results in no net toque to the rotor in the electric motor.

In addition to one or more of the features described above, or as an alternative, further embodiments of the method may include that the electric motor comprises a brushless direct current (BLDC) motor.

In addition to one or more of the features described above, or as an alternative, further embodiments of the method may include that the BLDC motor comprises a switched reluctance motor.

In addition to one or more of the features described above, or as an alternative, further embodiments of the method may include that the electric motor drives an actuator.

In addition to one or more of the features described above, or as an alternative, further embodiments of the method may include calculating a position of the actuator based on the position of the rotor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
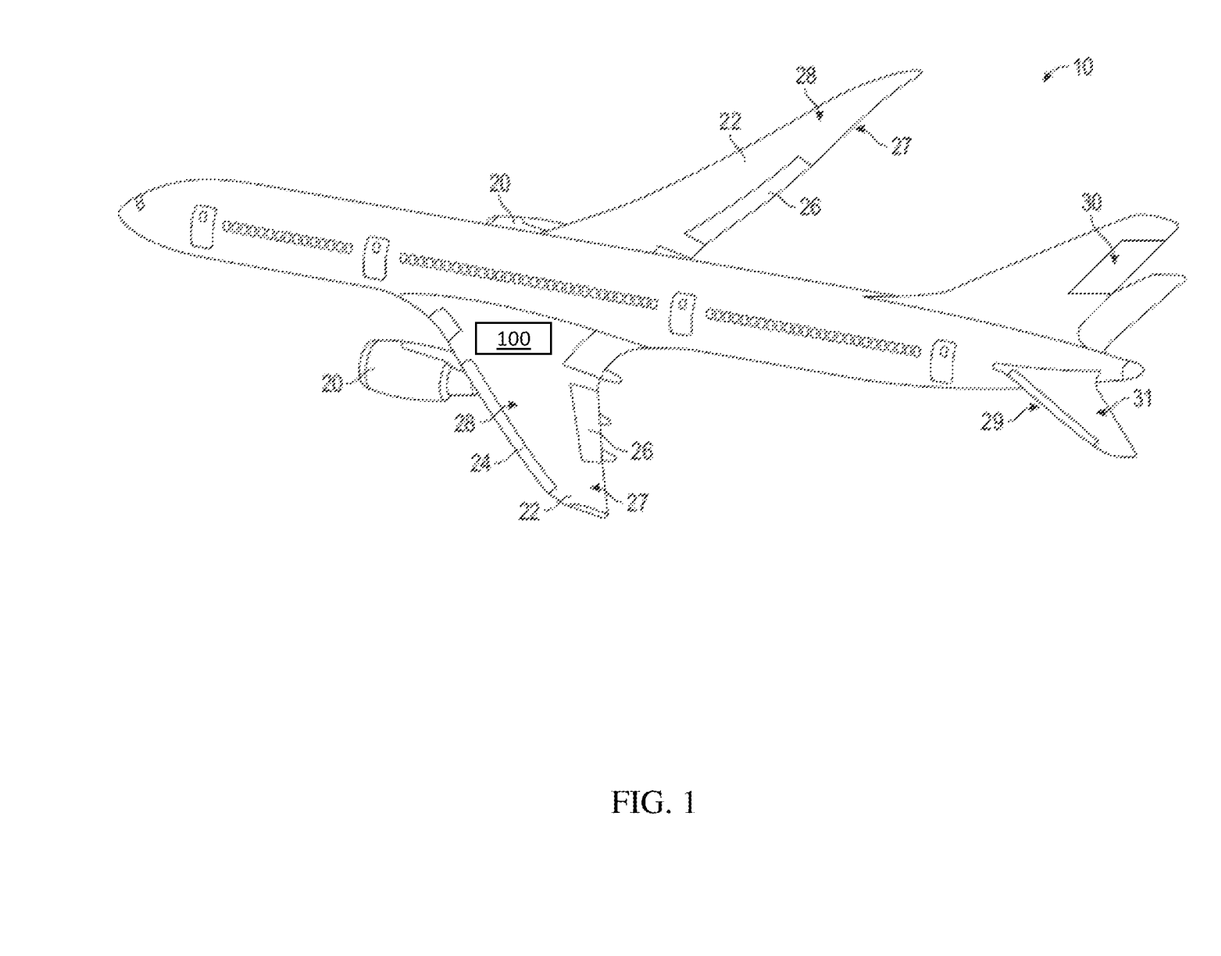
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes an apparatus 100 (described in greater detail in FIG. 2) which allows for "sensor-less" determination of rotor position in an electrical machine/motor on the aircraft 10. The electrical motor can serve a variety of function on the aircraft 10.

Turning now to an overview of technologies that are more specifically relevant to aspects of the disclosure, electromechanical actuation (EMA) provides many benefits to aircraft and aircraft systems. EMAs are mechanical actuators where the control mechanism has been replaced by an electric motor. The rotary motion of the electric motor is converted into linear displacement. In order to generate motion in an electric motor (e.g., a three-phase linear motor), there must be switching between the phases to energize appropriate windings. The process of switching between the phases is called commutation. In order to create the desired movement, a controller must determine which phase needs to be switched on and as such the controller must know the position of the rotor in the electric motor. As mentioned above, the components needed for motor commutation including position feedback sensors and complex electronic devices to process the signals are required for motor commutation. These additional components increase costs, increase weight, and decrease reliability.

In one or more embodiments, aspects described herein address the above described shortcomings by providing systems and methods for determining rotor position in an electric motor without the need for additional components for determining rotor position. In one or more embodiments, rotor position is determined "sensorlessly" by using preexisting sensors included in a motor driver for current control. As such, the systems and method described herein provide for determining rotor position in a salient-type motor such as a polyphase brushless DC (BLDC) motor or a switched reluctance motor to permit application of a proper commutation sequence. As explained below, one or more embodiments may determine the rotor position by measuring phase-winding inductance in the motor, and determine the rotor position based on a known relationship between the motor inductance and rotor position. A "salient-type" motor is characterized by a phase-winding inductance that varies with the rotor position. Measuring the phase-winding inductance is not dependent on motor speed and can determine the rotor position of a motor that is stationary or rotating at low speed.

BLDC motors and switched reluctance motors operate under the same principles; however, instead of permanent magnets on the rotor like in a BLDC motor, a switched reluctance motor utilizes a magnetic material such as iron for construction of the rotor. In a switched reluctance motor, the rotor is aligned whenever diametrically opposite stator poles are excited. In a magnetic circuit, the rotating member prefers to come to the minimum reluctance position at the instance of excitation. While two rotor poles are aligned to the two stator poles, another set of rotor poles is out of alignment with respect to a different set of stator poles. Then, this set of stator poles is excited to bring the rotor poles into alignment. Likewise, by sequentially switching the currents into the stator windings, the rotor is rotated. The movement of the rotor, hence the production of torque and power, involves switching of currents into stator windings when there is a variation of reluctance. The rotor position determination methodology described herein can be applied to both BLDC motors and switched reluctance motors.

Figure 2:
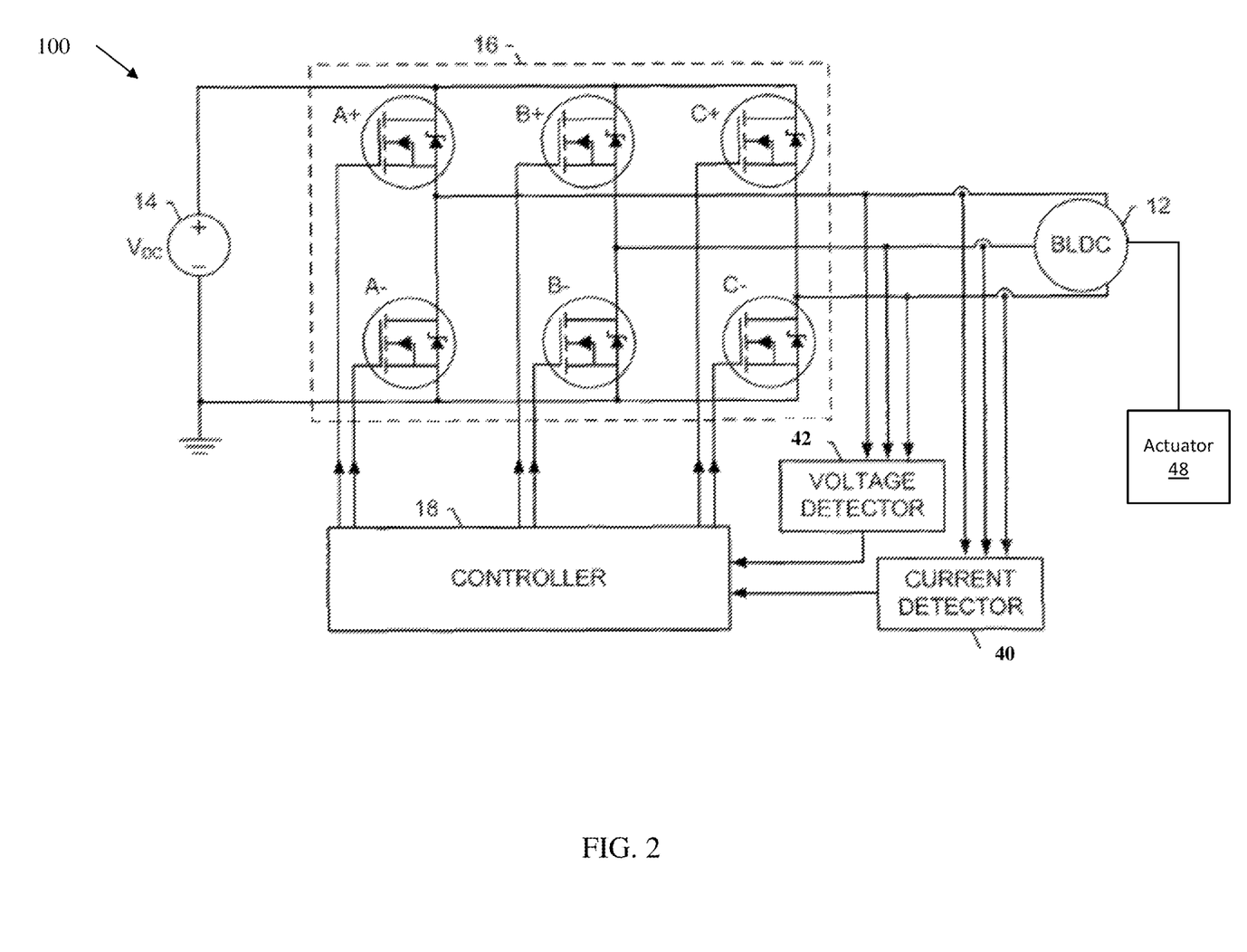
FIG. 2 depicts a block diagram of an apparatus (system) for controlling a BLDC motor and determining rotor position according to one or more embodiments.

FIG. 2 depicts a block diagram of an apparatus (system) 100 for controlling a BLDC motor and determining rotor position according to one or more embodiments. The motor 12 as illustrated including phases A, B and C each of which is separated by adjacent phases by 120°. The apparatus 100 includes a direct current (DC) voltage source 14 for supplying a DC voltage (supply voltage) $V_{DC}$ to an inverter 16. In one example, the DC voltage source may be provided by a rectifier for converting alternating current (AC) voltage from an AC power supply into a DC voltage. In one or more embodiments, the inverter 16 is a three-phase inverter that includes three pairs of switching elements for switchably energizing the three phases of the motor 12 in accordance with a commutation sequence driven by a controller 18.

The controller 18 can include any of a number of different means for performing the functions described herein. For example, the controller 18 can include one or more microprocessors, coprocessors, controllers, special-purpose integrated circuits such as, for example, application specific integrated circuits (ASICs), field programmable gate arrays (FPGAs), digital signal processors (DSPs), hardware accelerators, processing circuitry or other similar hardware. Additionally or alternatively, for example, the controller 18 may include one or more transistors, logic gates, a clock (e.g., oscillator) or other circuitry. Further for example, the controller may include one or more memory devices (e.g., non-volatile memory, volatile memory) configured to store instructions for execution by the controller 18 for performing one or more of its functions.

In one or more embodiments, each step of the commutation sequence includes energizing one phase winding positive (current entering) and energizing another winding negative (current exiting), while the third winding is not used (non-energized). The pairs of switching elements therefore include, for each phase, a switching element to energize the phase positive and a switching element to energize the phase negative. As shown, then, the pairs of switching elements include elements A+ and A− for phase A, elements B+ and B− for phase B, and elements C+ and C− for phase C. In one or more embodiments, for motors that have higher than three-phases (e.g. polyphase motors), one or more windings are not energized during the commutation sequence. In one or more embodiments, the motor 12 is connected to an actuator 48 for one or more applications within an aircraft, for example. The actuator 48 is controlled by the motor 12 where the rotational movement of the motor 12 is translated to linear movement by the actuator 48. The actuator 48 can be utilized to control operation of mechanical features of an aircraft such as airplane flaps, landing gear, and the like. The position of the rotor as determined by the methodologies described herein can be utilized to determine the position of the actuator 48 as well.

The speed of the BLDC motor 12 may be directly proportional to the voltage (and current) applied to its phase windings. In addition to controlling the commutation sequence, the controller 18 may additionally control the speed of the motor by controlling the phase voltages (and currents), such as in accordance with a pulse width modulation (PWM) technique. In accordance with PWM, the controller 18 can turn the appropriate switching elements in a given commutation step on (PWM high) and off (PWM low) at a particular frequency to achieve a desired average voltage (and current). The longer the switch is on relative to off (the larger the duty cycle), the higher the average voltage (and current) applied to the phase windings. The apparatus 100 may further include a current detector 40 configured to measure the phase currents, which may supply feedback for the PWM control.

Figure 4A:
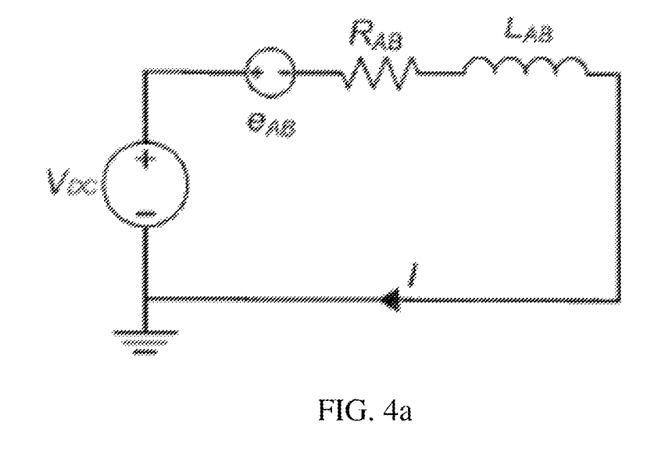
FIGS. 4a and 4b depict equivalent circuits during a PWM high-time and a PWM low-time.
Figure 4B:
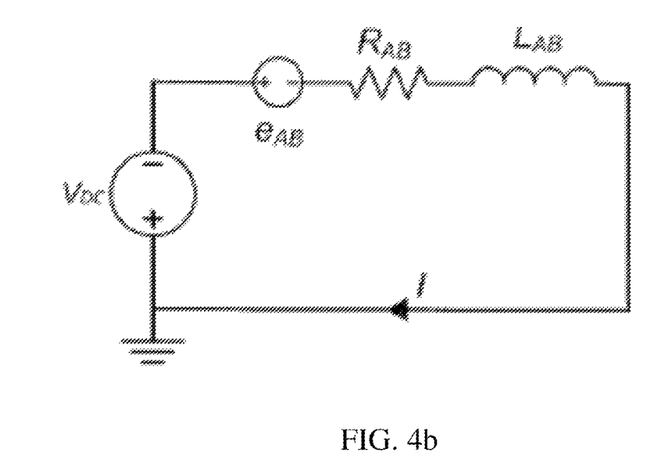

During a PWM high-time and a PWM low-time, the equivalent circuit of the apparatus 100 as shown in FIGS. 4a and 4b can be respectively represented as follows:

$$V_{DC} - I \times R_{AB} - L_{AB} \times \left(\frac{di}{dt}\right) - e_{AB} = 0 \qquad [1]$$

$$V_{DC} + I \times R_{AB} + L_{AB} \times \left(\frac{di_1}{dt_1}\right) + e_{AB} = 0 \qquad [2]$$

In the preceding, $$\frac{di}{dt}$$

Represents the change in phase current over the PWM high-time, and $$\frac{di_1}{dt_1}$$

Figure 3:
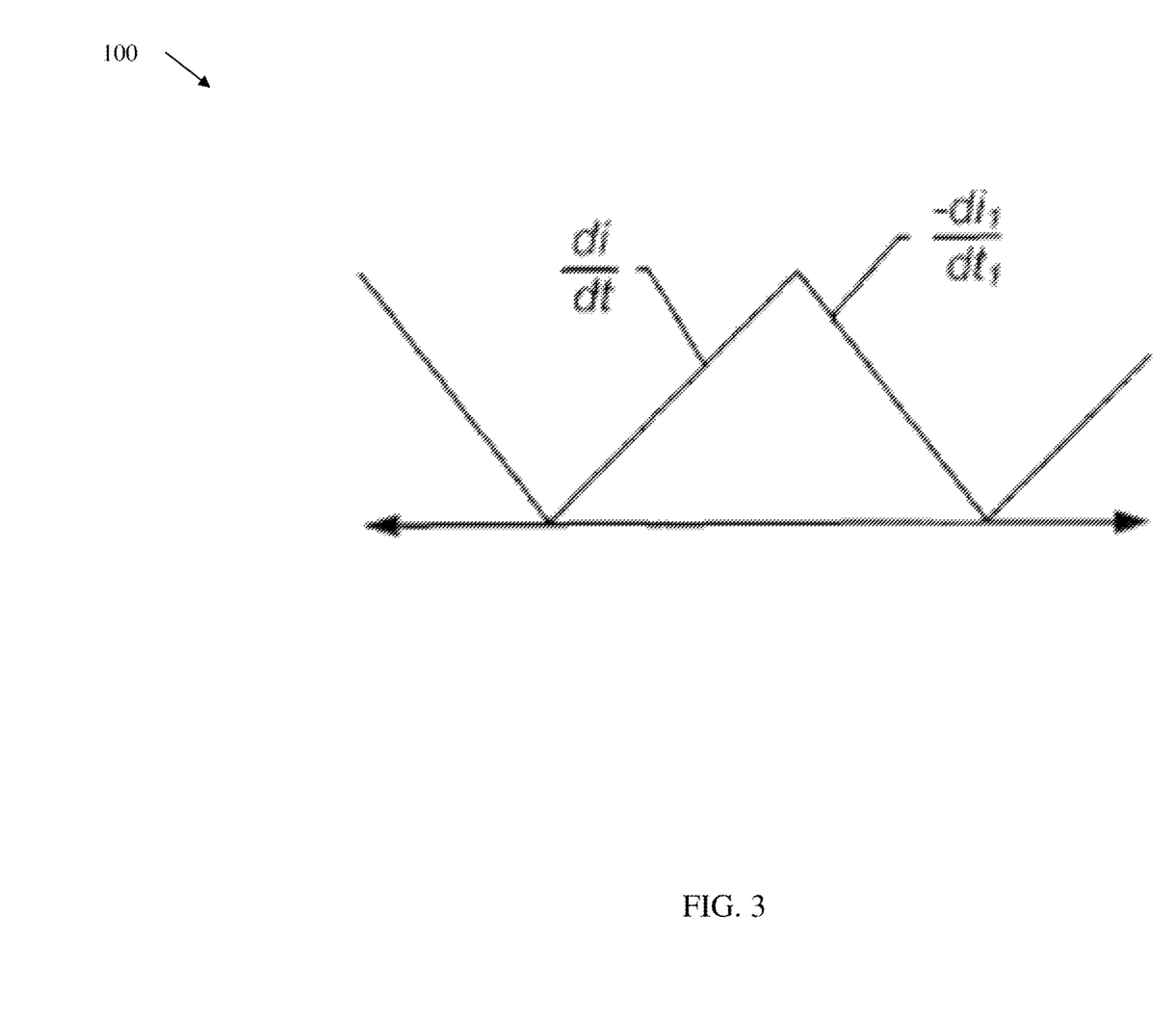
FIG. 3 depicts a graph representing the change in phase current over a PWM low-time.

Represents the change in phase current over the PWM low-time, as shown in, for example, FIG. 3. Equations [1] and [2] can be rearranged as follows:

$$L_{AB} \times \left(\frac{di}{dt}\right) = V_{DC} - I \times R_{AB} - e_{AB} \qquad [3]$$

$$-L_{AB} \times \left(\frac{di_1}{dt_1}\right) = V_{DC} + I \times R_{AB} + e_{AB} \qquad [4]$$

Equations [3] and [4] can be then added and solved of the phase-winding inductance LAB as follows:

$$L_{AB} = \frac{2V_{DC}}{\left(\frac{di}{dt} - \frac{di_1}{dt_1}\right)} \qquad [5]$$

And because $$\frac{di_1}{dt_1}$$

During the PWN low-time is always negative, the phase winding inductance can be simplified as follows:

$$L_{AB} = \frac{2V_{DC}}{\left(\left|\frac{di}{dt}\right| + \left|\frac{di_1}{dt_1}\right|\right)} \quad [6]$$

Which can be further generalized as an inductance of the motor L. The controller 18 can receive measurements of the voltage and current changes and calculate the phase winding inductance of a pair of phase windings as a function of the respective values in accordance with equation [6]. The controller may determine the position of the rotor of the BLDC motor 12 based on the calculated inductance and known relationship between the inductance and rotor position. The controller may then apply the appropriate commutation sequence based on the determined rotor position. The controller 18 may receive the requisite measurements in a number of different manners. In one example, the apparatus 10 may include a voltage detector 22 configured to detect or otherwise measure the voltage VDC, and supply the voltage to the controller 18.

In one or more embodiments, to apply a commutation sequence to an electric motor, the position of the rotor in the motor is required. In a salient-type motor, the phase winding inductance varies with the rotor position. By utilizing existing current sensors 40 and/or voltage sensors 42, the controller 18 can calculate the rotor position (rotor angle θ) by measuring the phase-winding inductance in the motor 12. The rotor angle θ can be calculating using the relationship between the motor inductance and the rotor angle θ. The relationship between these two variables is expressed below in equation [7].

This measurement is independent of back EMF and only requires measurement of the DC link voltage an phase current. Rotor position can then be calculated as the inductance is a known function of rotor position.

$$v = Ri + \frac{d\psi}{dt} = Ri + \frac{d\theta}{dt}\frac{d\psi}{d\theta} = Ri + \varpi_m\frac{d(Li)}{d\theta} = Ri + L\frac{di}{dt} + \varpi_m i\frac{dL}{d\theta} \quad [7]$$

Figure 5:
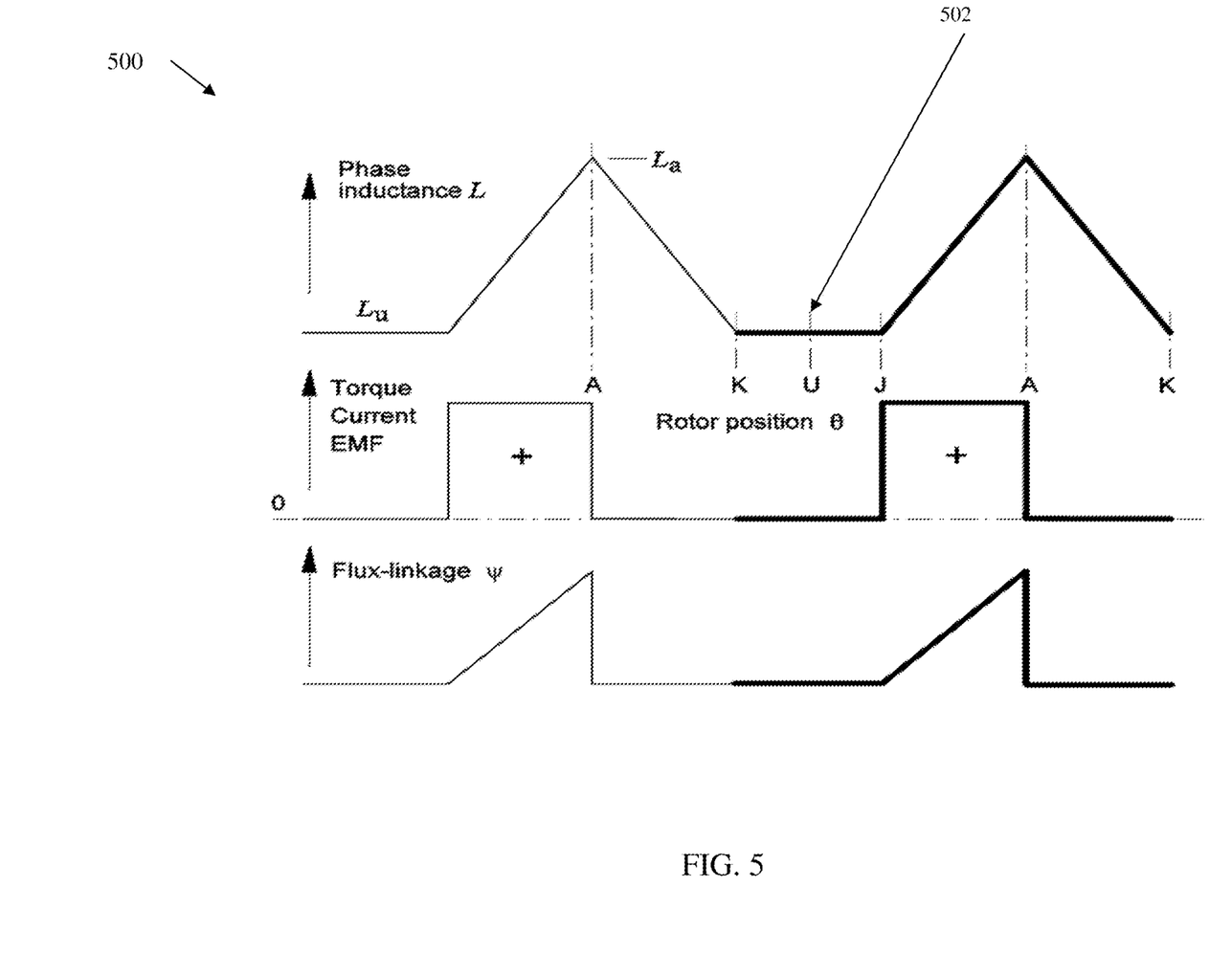
FIG. 5 depicts a graph depicting a typical inductance profile for a single phase and rotor angles that produce positive torque when energized.

FIG. 5 depicts a graph depicting a typical inductance profile for a single phase and rotor angles that produce positive torque when energized. In one or more embodiments, the supply voltage drops across three elements. These three elements are a resistive element, an inductive element, and a back electromotive force (EMF) element. Back EMF is typically used in brushless DC motors since it proportional to rotor position and speed. Here there is no real back EMF term but one that can be thought of as BEMF, ω*I*dL/dθ. Looking at FIG. 5, regions JAK are those of which the derivative term is non-zero; however, one is the torque generation area whereas the phase would be conducting for useful motoring. The other region would create negative torque (power generation) if used for BEMF observation. The magnitude of the negative torque differs only but the applied current. So any amount applied would take away from the useful torque. Therefore, the phases that are in the region are energized and whereas the inductive derivative is zero. The means of energizing the phase is with the same H-bridge that is used for commutation. An equation for torque T can be derived from equation [7] and is illustrated below in equation [8]

$$T = \frac{1}{2}i^2\frac{dL}{d\theta} \quad [8]$$

Figure 6:
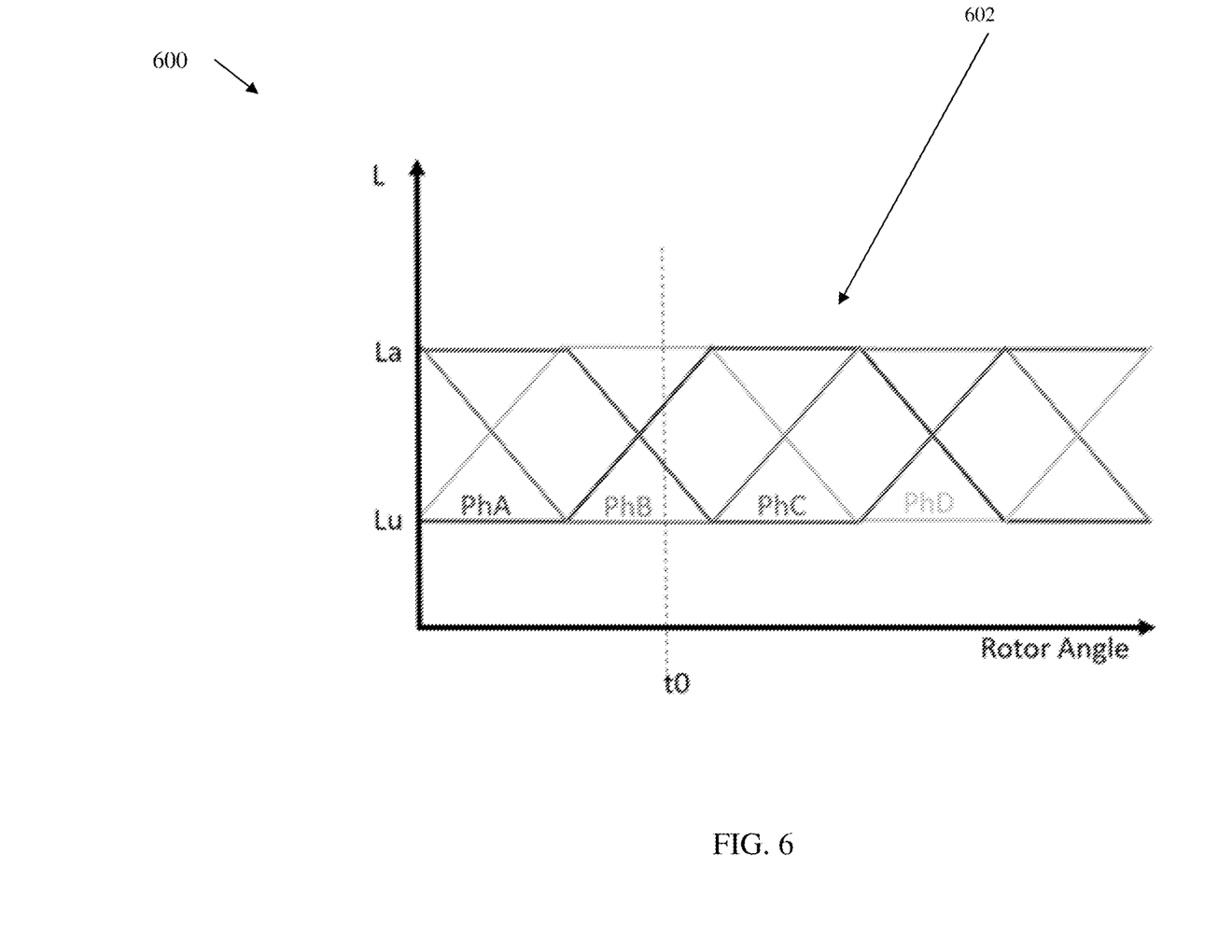
FIG. 6 depicts a typical inductance profile of all phases.

Referring back to FIG. 5, in the rotational region marked on the x-axis as KUJ502, a voltage can be placed onto the phase and the resulting current is measured while producing no net torque on the electric motor. Further, the injected voltage will not be influenced by the back EMF. The differential of the current supplies a measurement of the inductance which can be compared to the unaligned current. The resolution of this angle is that of the width of the unaligned inductance. The unaligned inductance refers to the inductance of the non-energized winding. As the phase count of the electrical motor increases (e.g., >3), the resolution is further reduced so that more than one phase is in a region of no net torque (i.e., dL/dθ=0). The initialization at zero speed is simply to determine what the active phase is to be commutated and to generate the initial condition of which any correction model (e.g., Kalman filter) will use. Knowing which phase to commutate also gives which phase(s) to excite to measure the unaligned inductance and infer rotor position. The region of uncertainty is that of which the inductance is the same, i.e. region KUJ in FIG. 5. FIG. 6 depicts a typical inductance profile of all phases (shown 4 could be any >2). At time=t0, the initialization occurs at a known zero speed, a voltage pulse is sent out as discussed above, and the current d/dt is read giving the three inductances, L_PhB=Lu && L_PhD=La, therefore for forward rotation, PhA is excited. The next phase to be excited will be PhB at some time=t0+θ*dt which depends on the load (unknown) and the motor mechanical and electromagnetic dynamics (known). While moving to PhB, inductance is measured at a high rate in PhD and PhB. Once an inflection is measured in phase b, it becomes the active phase, the prediction of the next phase switch over point (i.e. rotor velocity) is set and PhA&&C becomes the inductive measurement phases.

Figure 7:
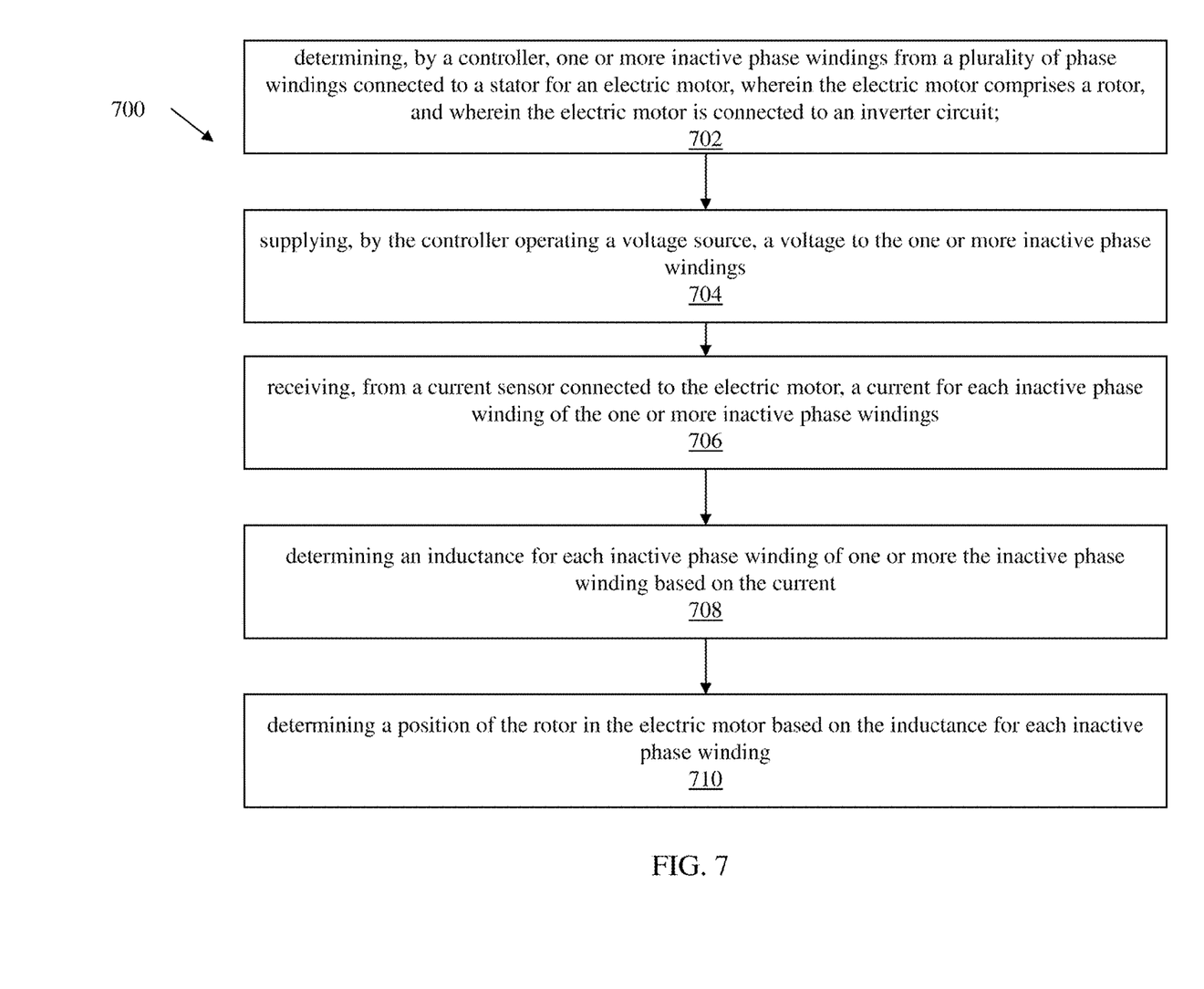
FIG. 7 depicts a flow diagram of a method for determining a position of a rotor in an electric motor according to one or more embodiments.

FIG. 7 depicts a flow diagram of a method for determining a position of a rotor in an electric motor according to one or more embodiments. The method 700 includes determining, by a controller, one or more inactive phase windings from a plurality of phase windings connected to a stator for an electric motor, wherein the electric motor comprises a rotor, and wherein the electric motor is connected to an inverter circuit, as shown in block 702. At block 704, the method 700 also includes supplying, by the controller operating a voltage source, a voltage to the one or more inactive phase windings. The method 700, at block 706, also includes receiving, from a current sensor connected to the electric motor, a current for each inactive phase winding of the one or more inactive phase windings. Also, at block 708, the method 700 includes determining an inductance for each inactive phase winding of one or more the inactive phase winding based on the current. And at block 710, the method 700 includes determining a position of the rotor in the electric motor based on the inductance for each inactive phase winding.

Additional processes may also be included. It should be understood that the processes depicted in FIG. 7 represent illustrations, and that other processes may be added or existing processes may be removed, modified, or rearranged without departing from the scope and spirit of the present disclosure The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a direct current (DC) power source connected to an inverter circuit;
   an electric motor comprising a rotor and a stator, wherein an output of the inverter circuit is connected to a plurality of phase windings attached to the stator; and
   a controller configured to operate the electric motor and the inverter circuit, wherein the controller is further configured to:
      determine one or more inactive phase windings from the plurality of phase windings;
      supply a voltage to the one or more inactive phase windings;
      receive, from a current sensor connected to the electric motor, a current for each inactive phase winding of the one or more inactive phase windings;
      determine an inductance for each inactive phase winding of one or more the inactive phase winding based on the current; and
      determine a position of the rotor in the electric motor based on the inductance for each inactive phase winding.

2. The system of claim 1, wherein supplying the voltage to the one or more inactive phase windings from the plurality of phase windings occurs while the rotor is rotating at a first speed.

3. The system of claim 1, wherein the plurality of phase windings comprises a first phase winding, a second phase winding, and a third phase winding.

4. The system of claim 3, wherein supplying the voltage to the one or more inactive phase windings from the plurality of phase windings occurs while the rotor is not rotating; and wherein the voltage is supplied to all phase windings in the plurality of phase windings.

5. The system of claim 1, wherein the inactive phase winding comprises a phase winding in the plurality of phase windings not receiving a voltage from the inverter circuit.

6. The system of claim 1, wherein the applying the voltage to the inactive phase winding results in no net toque to the rotor in the electric motor.

7. The system of claim 1, wherein the electric motor comprises a brushless direct current (BLDC) motor.

8. The system of claim 7, wherein the BLDC motor comprises a switched reluctance motor.

9. The system of claim 1, wherein the electric motor drives an actuator.

10. The system of claim 9, wherein the controller is further configured to calculate a position of the actuator based on the position of the rotor.

11. A method comprising:
   determining, by a controller, one or more inactive phase windings from a plurality of phase windings connected to a stator for an electric motor, wherein the electric motor comprises a rotor, and wherein the electric motor is connected to an inverter circuit;
   supplying, by the controller operating a voltage source, a voltage to the one or more inactive phase windings;

receiving, from a current sensor connected to the electric motor, a current for each inactive phase winding of the one or more inactive phase windings;

determining an inductance for each inactive phase winding of one or more the inactive phase winding based on the current; and determining a position of the rotor in the electric motor based on the inductance for each inactive phase winding.

12. The method of claim 11, wherein supplying the voltage to the one or more inactive phase windings from the plurality of phase windings occurs while the rotor is rotating at a first speed.

13. The method of claim 11, wherein the plurality of phase windings comprises a first phase winding, a second phase winding, and a third phase winding.

14. The method of claim 13, wherein supplying the voltage to the one or more inactive phase windings from the plurality of phase windings occurs while the rotor is not rotating; and wherein the voltage is supplied to all phase windings in the plurality of phase windings.

15. The method of claim 11, wherein the inactive phase winding comprises a phase winding in the plurality of phase windings not receiving a voltage from the inverter circuit.

16. The method of claim 11, wherein the applying the voltage to the inactive phase winding results in no net toque to the rotor in the electric motor.

17. The method of claim 11, wherein the electric motor comprises a brushless direct current (BLDC) motor.

18. The method of claim 17, wherein the BLDC motor comprises a switched reluctance motor.

19. The method of claim 11, wherein the electric motor drives an actuator.

20. The method of claim 19, further comprising: calculating a position of the actuator based on the position of the rotor.

* * * * *